United States Patent [19]

Myer

[11] 3,721,907

[45] March 20, 1973

[54] DETECTION OF RANGE MARKS NEAREST THE CENTER OF A RANGE GATE

[75] Inventor: Robert E. Myer, Denville, N.J.

[73] Assignee: Bell Telephone Laboratories Incorporated

[22] Filed: Nov. 5, 1971

[21] Appl. No.: 196,086

[52] U.S. Cl. ..................328/109, 307/228, 307/232, 307/235 A, 328/185, 343/17.1 R

[51] Int. Cl. ..........H03k 5/18, G01s 9/12, H03k 4/20

[58] Field of Search......307/232, 234, 235 A, 228, 235 R; 328/109, 110, 115, 128, 184, 130, 150, 151, 181, 185; 343/5 DP, 7.3, 17.1 R

[56] References Cited

UNITED STATES PATENTS

| | | | |
|---|---|---|---|
| 3,113,221 | 12/1963 | Okuda | 307/292 X |
| 2,711,532 | 6/1955 | Slusser | 328/110 X |
| 3,015,817 | 1/1962 | Pastoriza | 328/110 X |
| 3,271,767 | 9/1966 | Larky | 343/7.3 X |
| 3,317,754 | 5/1967 | Comer et al. | 307/255 X |
| 3,344,421 | 9/1967 | Dildy, Jr. | 343/17.1 R X |
| 3,354,455 | 11/1967 | Briggs et al. | 343/7.3 |
| 3,473,130 | 10/1969 | Briggs | 343/7.3 X |
| 3,478,355 | 11/1969 | Lundgreen et al. | 343/7.3 |

*Primary Examiner*—Herman Karl Saalbach
*Assistant Examiner*—L. N. Anagnos
*Attorney*—Charles K. Wright et al.

[57] ABSTRACT

The range marks coming in are combined with a triangular ramp voltage waveform from a ramp generator. The ramp has the same width as the range gate and its peak at the center of the gate. The largest amplitude of the combined range mark and triangular ramp is the range mark nearest to the center of the range gate. This is selected by a largest amplitude detector system.

4 Claims, 2 Drawing Figures

PATENTED MAR 20 1973 3,721,907

Robert E. Myer,
INVENTOR.

Jack W. Voigt

BY Robert C. Sims

DETECTION OF RANGE MARKS NEAREST THE CENTER OF A RANGE GATE

SUMMARY OF THE INVENTION

In many radar systems, such as the Safeguard system, it is possible to have more than one range mark in the range gate. The range mark nearest the center of the range gate is most likely to be the correct or desired one. In order to select the range mark nearest the center, the range marks are combined with the output of a ramp generator. The ramp generator generates a triangular ramp which has a width equal to the width of the range gate. The peak of the triangular ramp will be exactly in the center of range gate. The combination of the range marks and the triangular ramp is fed to a largest amplitude detector. The triangular ramp generator is composed of a Miller integrator and a flip-flop. The leading edge of the range gate sets the flip-flop which starts the Miller integrator. A linearly increasing voltage is produced at its output. This is fed back through a circuit which will reset the flip-flop at the very center of the range gate. Then a linearly decreasing voltage is produced at the output of the ramp generator which reaches the starting voltage at the end of the gate. The last range mark out of the largest amplitude detector coincides with the largest amplitude mark at the input. Because of the ramp shape this will also be the mark nearest to the center of the gate. A last in the gate detector is provided for selecting the last output of the largest amplitude detector. This output will be delayed by amount equal to the width of the range gate. This selection could also be done in a radar system by shifting a digital number from a clock into a register each time a range mark is received from the largest amplitude detector. The number in the register at the end of the gate will indicate the range of the last mark received; which is the one nearest the center.

BRIEF DESCRIPTION OF THE DRAWINGS

FIG. 2A–G are wavepoints at various points throughout the circuit shown in FIG. 1.

DESCRIPTION OF THE PREFERRED EMBODIMENT

Figures 1, 2:
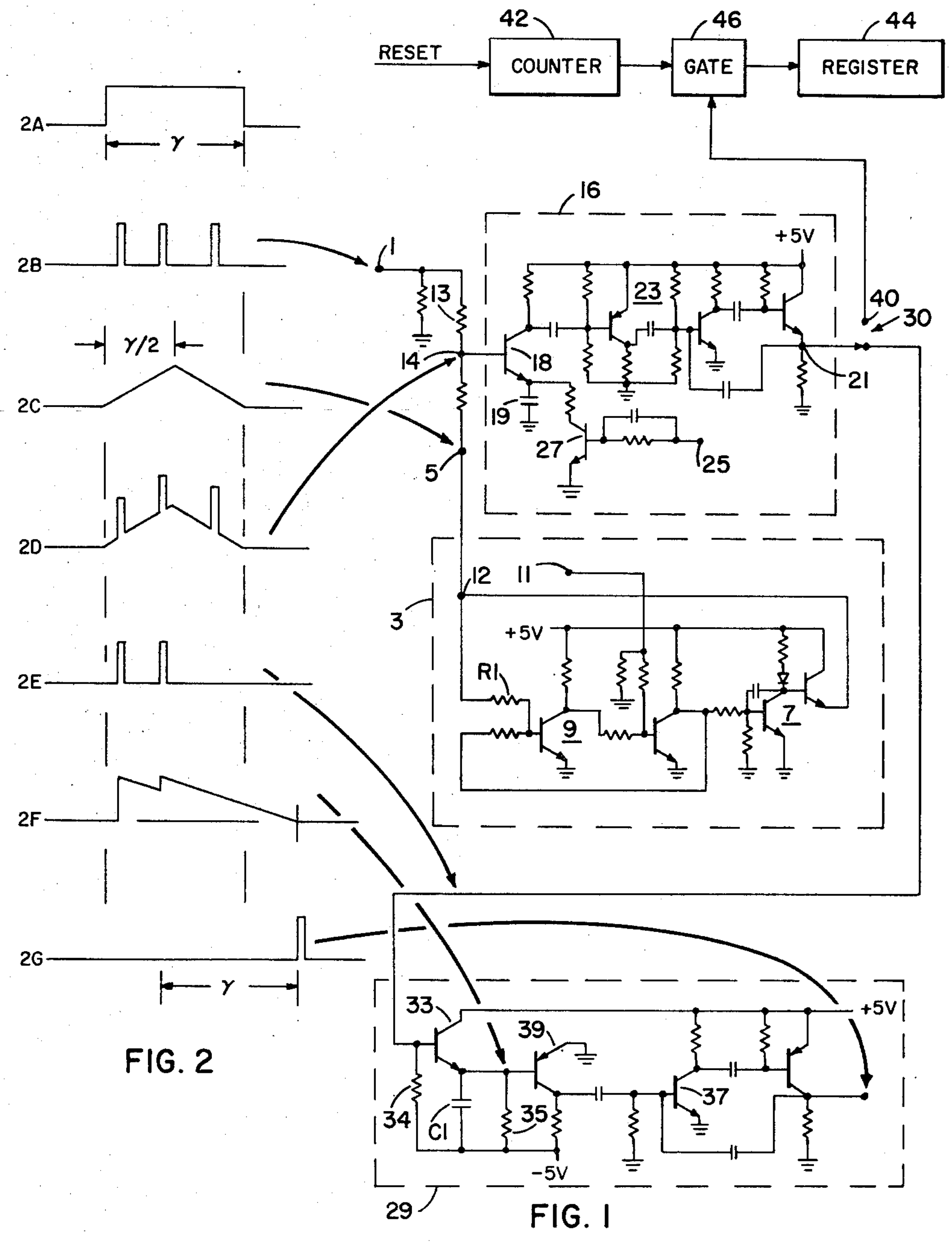
FIG. 1 is a schematic showing of the preferred embodiment of the present invention.

Referring to FIG. 1, terminal 1 is to be connected to the receiver of a radar system not shown so as to receive the range marks therefrom. In some of the radar systems, it is possible to have more than one range mark inside of a range gate. One preferred method of selection of these range marks is to isolate the mark nearest to the center of the range gate. This method of selection is the object of the present invention. FIGS. 2A–G are waveforms wherein the abscissa is time and the ordinate is voltage. FIG. 2A shows the range gate which has a time interval of $\tau$. FIG. 2B shows range marks within the range gate of 2A. The range marks of FIG. 2B are those that are fed to terminal 1 of FIG. 1. A triangular ramp generator 3 produces a triangular waveform FIG. 2C at terminal 5. The triangular ramp generator 3 is composed of a Miller integrator 7 and a flip-flop 9. Miller integrator and flip-flop 9 are components well known in the art and their complete operation will not be explained. The signals FIG. 2A of the range gate are fed to set terminal 11 so that the leading edge of the range gate sets flip-flop 9. When flip-flop 9 is set it starts the Miller integrator 7 which will produce a linearly increasing voltage at its output 12. This voltage is fed back to the reset input of flip-flop 9 by way of resistor R1, and it will reset the flip-flop 9 when a predetermined voltage is reached. The components are so selected that this predetermined voltage will be reached at exactly the center of the range gate. When the flip-flop 9 is reset then the Miller integrator will produce a linearly decreasing voltage at its output which will reach the starting voltage at the end of the gate. The triangular ramp FIG. 2C is combined with the range marks FIG. 2B at terminal 14 by resistors 13 and 15 to produce the combination waveform shown in FIG. 2D.

A largest amplitude detector 16 has its input connected to terminal 14. Detector 16 can take the form of any of the known largest amplitude detectors such as that shown in the patent to Comer et al. U.S. Pat. No. 3,317,754, patented May 2, 1967. The operation of detector 16, broadly put, is as follows: As the first range mark pulse is received by transistor 18, transistor 18 will be put in its on condition will charge up capacitor 19 to the value of the input pulse. Any further pulses received at the input of transistor 18 will not turn transistor to its on condition unless it is a pulse of a value greater than the voltage stored on capacitor 19. Each time transistor 18 is turned on, not only is capacitor 19 charge, but an output pulse is produced at output terminal 21 by way of the amplifiers 23. It can be seen from this that the last pulse produced at the output 21 will correspond to the largest input to the detector 16. In the example shown by the range marks in FIG. 2B, it can be seen that the first range mark will cause transistor 18 to turn on and charge capacitor 19 to its value. At the same time an output will be produced at terminal 21. When the second range mark occurs, its voltage combined with the triangular ramp will be greater than that stored on capacitor 19; therefore transistor 18 will again be turned to an on condition, and again an output will be produced at terminal 21. However when the third range mark occurs, its value combined with the triangular ramp is not greater than that voltage stored on capacitor 19; therefore transistor 18 will not turn on, and there will not be an output at terminal 21. From this it can be seen that the last output of detector 16 was the second range mark, which of course is the mark closest to the center of the range gate. The range gate signal of FIG. 2A is fed to terminal 25 so as to discharge capacitor 19 by turning on transistor 27 when the leading edge of the range gate occurs. In this way the detector 16 is reset for each new range gate.

In order to determine which was the largest pulse, a last in the gate detector 29 is provided. A switch 30 may be provided so as to choose which system of selection is used. Detector 29 consists of transistor 33, resistors 34 and 35, capacitor C1, and amplifier 37. When there is an output at terminal 21 and switch 30 is in the position shown, capacitor C1 will be charged through transistor 33 to a voltage equal to its peak amplitude. Capacitor C1 discharges through resistor 35 until it drops below the threshold of transistor 39. At this point transistor 39 will turn on and trigger the generation of a new range mark which is delayed from the input range by the discharge time of C1. This discharge time is set to be equal to the range gate width. If more than one range mark is in the gate, only the last one will allow time for capacitor C1 to drop below the threshold and cause the generation of an output range mark. This is so because each range mark output from detector 16 causes capacitor C1 to charge back up to its peak level which restarts the delay time. FIG. 2F shows the voltage across the capacitor C1 in the example given. Therefore detector 29 will select the last output of detector 16 and delay it by one range gate FIG. 2G. If the range gates are too close together a duplicate detector 29 may be used alternately to select the last in the gate range mark.

An alternate system of selecting the last output of detector 16 would be the system shown connected to terminal 40 of switch 30. A counter or clock device 42 is reset to zero by the front edge of the range gate and the number in the counter will be shifted out into a register device 44 by a gate 46 when there is an output of detector 16. The number in the register at the end of the gate indicates the range of the last mark received, which will be the one nearest the center.

I claim:

1. A system for the selection of a signal, out of a plurality of signals having approximately the same amplitude, which is nearest to the center of a period of time comprising a triangular ramp generator means; a largest amplitude detector means having an input and an output; means combining the signals with the output of the generator means and connecting the combination to the input of the detector means; selector means connected to the output of said detector means;

wherein said signals are range marks; said period of time is a range gate; and said triangular ramp generator means being started at the start of the range gate, reaching its peak value at the midpoint of the range gate and declining to its starting value at the end of the range gate.

2. A claim as set forth in claim 1 wherein said largest amplitude detector means will have an output each time its input has a value greater than the previous input; and said selector means selecting the last output of said largest amplitude detector means.

3. A claim as set forth in claim 2 wherein said selector means comprises a capacitor which is charged to its peak value upon an output from the detector means; a discharge path for said capacitor having a design such that the capacitor will take one range gate time to discharge to a predetermined value; an amplifier means connected to the capacitor so as to have an output when said capacitor discharges to said predetermined value; and said amplifier being connected to an output of said selector.

4. A system as set forth in claim 2 wherein said selector means comprises a counter means, gate means, and register means; said counter means being connected through said gate means to the register means when said gate means is activated; said counter being reset to a starting value upon the start of the range gate; and said detector having its output connected to said gate means to activate same upon generation of an output.

* * * * *